Nov. 28, 1933.   L. E. HODGES   1,937,022
DRAW WORKS BRAKE MECHANISM
Filed June 14, 1932
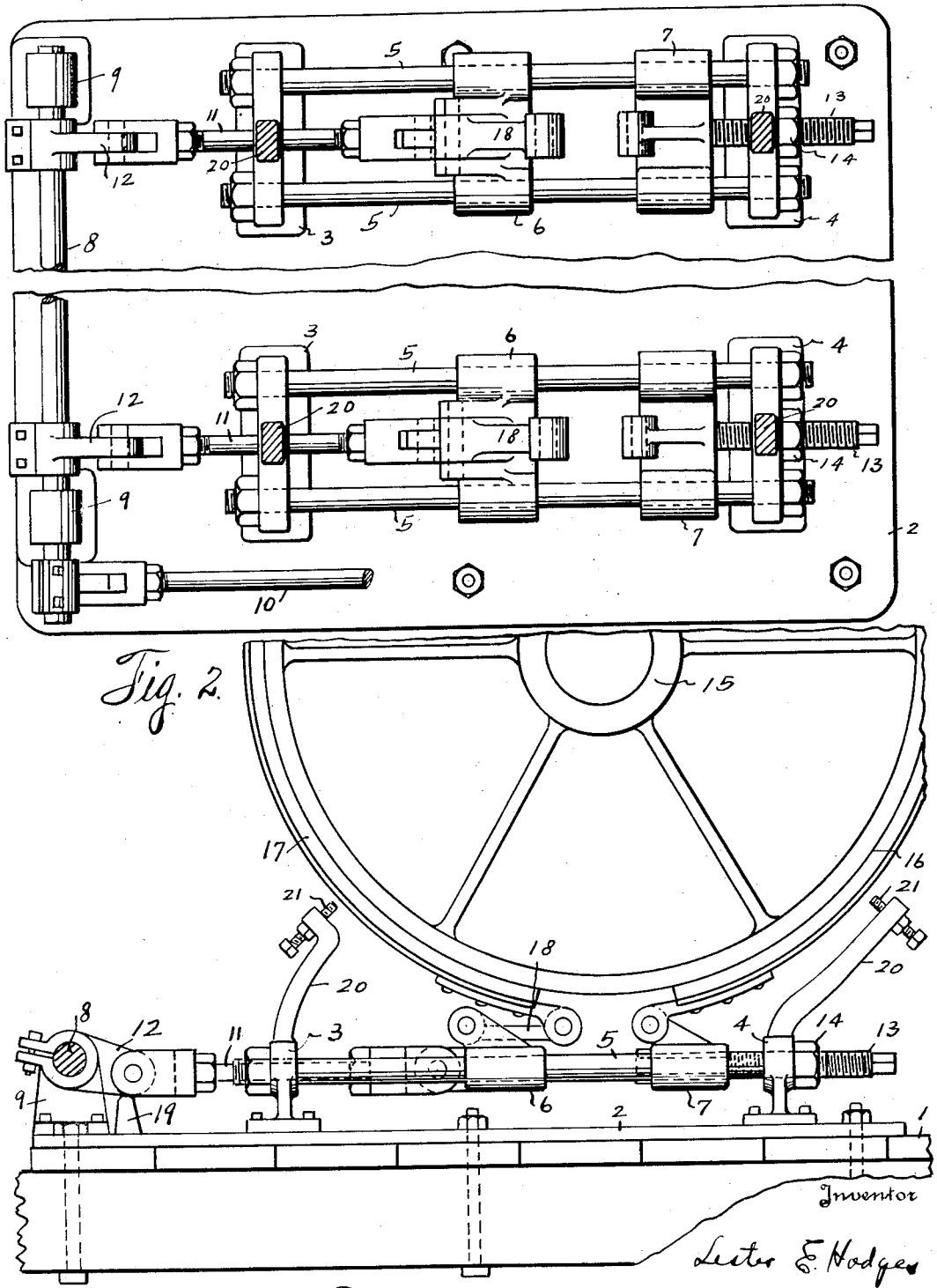

Patented Nov. 28, 1933

1,937,022

UNITED STATES PATENT OFFICE 1,937,022

DRAW WORKS BRAKE MECHANISM

Lester E. Hodges, Houston, Tex.

Application June 14, 1932. Serial No. 617,148

3 Claims. (Cl. 188—77)

This invention relates to draw works brake mechanism and this application is a continuation in part of my co-pending application filed May 19, 1931, under Serial No. 438,455.

An object of the invention is to provide mechanism of the character described specially applicable to the cable winding drum of the draw works of well drilling rig but is capable of general application for braking purposes.

Another object of the invention resides in the provision of novel means for setting and releasing the brake by the use of which a maximum area of the braking surface of the brake drum may be utilized and maximum braking capacity thus obtained; and the invention also comprehends novel means whereby the brake may be securely held in set or braking position.

A further feature of the invention resides in provision of means for holding the brake band out of contact with the opposing brake surface when the brake is released.

With the above and other objects in view the invention has particular relation to certain novel features of construction, operation and arrangement of parts, an example of which is given in this specification and illustrated in the accompanying drawing, wherein:

Figure 1 shows a fragmentary side elevation of the brake mechanism, and

Figure 2 shows a plan view of the operating mechanism.

Referring now more particularly to the drawing wherein like numerals of reference designate similar parts in each of the figures the numeral 1, in the present illustration, indicates the derrick floor and the numeral 2 designates a suitable base plate anchored to the floor and on which the brake operating mechanism is mounted. As illustrated in Figure 2, two units are shown operable through a common shaft for the purpose of simultaneously operating two brake bands one at each end of a drum, however a single unit may be employed as will be obvious from the description herein.

Front and rear brackets 3, 4 are provided and the rods 5, 5 are anchored to said respective brackets and spaced apart forming tracks. Slidable on these tracks are the front and rear yokes 6, 7, each yoke having suitable end bearings which slide on the respective tracks 5. The numeral 8 designates a common brake shaft mounted to rotate in suitable bearings 9, 9 and fixed to one end of which there is the brake lever 10. There is a connecting link 11 connected at one end to each front yoke 6 and whose other end is connected to a depending arm 12 which is fixed to the brake shaft 8. Each link 11 is pivotally connected to its corresponding yoke 6 and arm 12 on horizontal axes and works loosely through a bearing in the corresponding bracket 3. There are the externally threaded adjusting rods 13 threaded through the respective brackets 4 and having a swivelling connection with the corresponding yokes 7 and through which said yokes may be adjusted along said tracks 5. Each adjusting rod 13 is equipped with a lock nut 14 whereby the corresponding yoke may be fixed at any point of adjustment.

A suitable drum as 15 may be mounted in any conventional manner and its ends are provided with suitable brake surfaces as 16 each of which is surrounded by a brake band as 17. One end of each band is connected to a stationary yoke 7. A link 18 is pivotally connected at its forward end to the yoke 6 and its other end is pivotally connected to the other end of said brake band 17.

It is obvious that by manipulating the brake lever 10 so as to force the yoke 6 inwardly the ends of the brake band will be forced toward each other and said band thus clamped around the brake surface 16. The yoke 7 may be adjusted so as to tighten up or loosen said brake band in the usual way. When the lever 10 is operated in the other direction, the brake band will be released from the brake surface 16.

When the lever 10 is operated to set the brake, as above described, the pivotal connection between the arm 12 and the link 11 will move on slightly past center, that is slightly past the line connecting the axis of the shaft 8 and the pivotal point of connection between the link 11 and the yoke 6, and when the arm 12 has moved to final braking position it will be stopped by the upstanding stop 19 and the brake band 17 will thus be held in set, or braking, position until the braking lever 10 is reversed and a very simple and efficient means is thus provided for holding the brake set.

There are the upstanding brackets 20, 20 having the adjustable stops 21, 21 arranged one on each side of the brake band and underneath the same so that when the brake band is released it will rest against said stops and be supported thereby out of contact with the corresponding brake surface to the end that when the brake is released the band will be maintained clear of the brake surface all of the way around.

The drawing and description disclose what is now considered to be a preferred form of the invention by way of illustration only, while the broad principle of the invention will be defined by the appended claims:

What I claim is:

1. Brake mechanism including a brake band, adapted to surround a brake surface, spaced rods forming a track, a pair of yokes on said track one of which is connected to one end of said brake band, means for adjusting said last-mentioned yoke, the other yoke being movable on said track, a link connecting said movable yoke to the other end of said brake band, an operating mechanism and a link connecting said operating mechanism to said movable yoke, said links being located between said rods and working in approximately parallel relation.

2. A brake mechanism including a brake band adapted to surround a brake surface, a track, a stationary anchor to which one end of said brake band is attached, a yoke movable on said track and connected to the other end of said brake band, a brake shaft, an arm thereon, a link pivoted at one end to the free end of said arm and pivoted at its other end to said movable yoke, said arm being movable in one direction to release said band and being movable into another position past center to effect the setting of the brake and a stop arranged to limit the movement of said arm in said last mentioned direction whereby the brake will be maintained set.

3. A brake mechanism including a brake band adapted to surround a brake surface, a track, a stationary anchor to which one end of said band is attached, an anchor movable along said track to which the other end of the band is attached, a link pivoted at one end to said movable anchor, a swinging arm whose free end is pivoted to the other end of said link, means for actuating said arm in one direction to effect the release of said brake band and in another direction to carry the free end of the arm past center and to effect the setting of the brake and a stop to limit the movement of said arm in said last mentioned direction whereby the brake will be maintained set.

LESTER E. HODGES.